United States Patent [19]
Lorriette

[11] Patent Number: 5,687,821
[45] Date of Patent: Nov. 18, 1997

[54] WET CLUTCH ASSEMBLY

[75] Inventor: Patrick Lorriette, Jaux, France

[73] Assignee: Massey-Ferguson SA, France

[21] Appl. No.: 575,717

[22] Filed: Dec. 20, 1995

[30] Foreign Application Priority Data

Jan. 30, 1992 [GB] United Kingdom ............... 9501753
Dec. 24, 1994 [GB] United Kingdom ............... 9426248

[51] Int. Cl.$^6$ ............................................. F16D 25/063
[52] U.S. Cl. .................. 192/52.4; 192/70.12; 192/91 A; 192/85 AA
[58] Field of Search ................. 192/52.4, 70.12, 192/91 A, 91 R, 70.27, 85 A, 85 AA

[56] References Cited

U.S. PATENT DOCUMENTS

| | | |
|---|---|---|
| 4,069,904 | 1/1978 | Garrett et al. . |
| 4,091,905 | 5/1978 | Sieren et al. . |
| 4,573,561 | 3/1986 | Deem et al. . |
| 4,574,926 | 3/1986 | Bubak ............... 192/70.12 X |
| 4,646,889 | 3/1987 | Hoffman et al. . |
| 4,776,444 | 10/1988 | Worner et al. . |
| 4,802,564 | 2/1989 | Stodt . |
| 4,934,502 | 6/1990 | Horsch . |
| 5,090,539 | 2/1992 | Wolf et al. . |
| 5,119,923 | 6/1992 | Jonsson et al. ........... 192/70.12 |
| 5,261,517 | 11/1993 | Hering ............... 192/70.27 X |
| 5,284,232 | 2/1994 | Prud'Homme . |

FOREIGN PATENT DOCUMENTS

| | | |
|---|---|---|
| 95841 | 12/1983 | European Pat. Off. . |
| 955852 | 4/1964 | United Kingdom . |
| 1136872 | 12/1968 | United Kingdom . |
| 1255003 | 11/1971 | United Kingdom . |
| 1365393 | 9/1974 | United Kingdom . |
| 1483860 | 8/1977 | United Kingdom . |
| 2191252 | 12/1987 | United Kingdom . |

*Primary Examiner*—Andrea L. Pitts
*Attorney, Agent, or Firm*—MacMillan, Sobanski & Todd

[57] ABSTRACT

A spring-engaged wet clutch assembly, particularly suitable for a vehicle main clutch, comprises a stack of interleaved clutch members biassed into engagement by a Belleville spring. The clutch assembly includes hydraulic means for disengaging the stack. Interposed between the engagement Belleville spring and the stack is a further Belleville spring or springs which the engagement Belleville acts against, and which provides progressive engagement of the clutch and also allows less powerful hydraulic means for disengaging the clutch to be used.

5 Claims, 4 Drawing Sheets

WET CLUTCH ASSEMBLY

BACKGROUND TO THE INVENTION

The present invention relates to a wet clutch assembly.

Wet clutch assemblies, that is incorporating clutches in which oil is used to cool and lubricate the clutch plates are well known. The clutches can be pressure engaged and spring disengaged as is usually the case for high horse power applications, or they can be spring engaged and pressure disengaged as in this case, for use in lower horse power applications.

Known wet clutch assemblies suffer from the disadvantage that they tend to engage and disengage too suddenly, progressive engagement being preferable.

It is an aim of the present invention to provide an improved wet clutch assembly.

SUMMARY OF THE INVENTION

According to the invention, which applies principally to a main vehicle clutch, as opposed to a clutch in an automotive gearbox for example, a wet clutch assembly comprises a stack of interleaved substantially parallel clutch members and means, comprising an element at each end of the stack and a resilient engagement member interposed therebetween, for selectively applying compressive pressure to the stack, characterised in that the said means for applying pressure also includes at least one resilient progressivity member through which pressure is transmitted to the stack which is sufficient to engage the clutch members in the stack for transmission of torque.

The normal arrangement is for the stack to be located between a clutch drive plate connected to the input shaft and a portion of the clutch drum, also connected for rotation with the input shaft. In this arrangement, the progressivity member could be interposed between the clutch drive plate and stack (in which case it would normally be in contact with an element of the stack which is rotationally fast with the clutch drive plate) and/or between the said portion of the drum and the stack. Alternatively, the said portion of the drum and/or the drive plate could have resilient properties and thereby constitute the said progressivity member(s).

In this arrangement, movement of the pressure applying means through a given distance will stress the progressivity member by a given amount, and the corresponding pressure on the clutch members in the stack will be determined by the distance through which the pressure applying means have moved and also the spring constant of the progressivity member. The pressure on the stack will therefore increase and decrease gradually with the movement of the pressure applying means, providing excellent progressivity in the amount of torque transmitted by the clutch.

The stack is compressed by the resilient engagement member, acting through the said progressivity member(s). The function of the resilient engagement member is thus simply to apply pressure to the stack and the function of the progressivity member(s) is purely to provide progressivity, ie smooth variation in the amount of pressure transmitted to the stack for a given distance through which the clutch pedal is moved.

It will be understood that the force applied by the resilient engagement member to the stack is not decreased because of the presence of the said progressivity member(s).

The clutch arrangement described above normally includes hydraulic means for disengaging the clutch. In this arrangement, the said progressivity member(s) assist the disengagement of the clutch, and the hydraulic means need not be as powerful as they would be if the progressivity member(s) were omitted.

The progressivity member can of course be provided with a spring constant which is appropriate for the particular requirements of the clutch. Two or more progressivity members may be provided with different spring constants to provide for example very gentle initial engagement of the clutch, and subsequently more rapid engagement.

Preferably, the progressivity member or members are Belleville springs.

DETAILED DESCRIPTION

Figure 4:
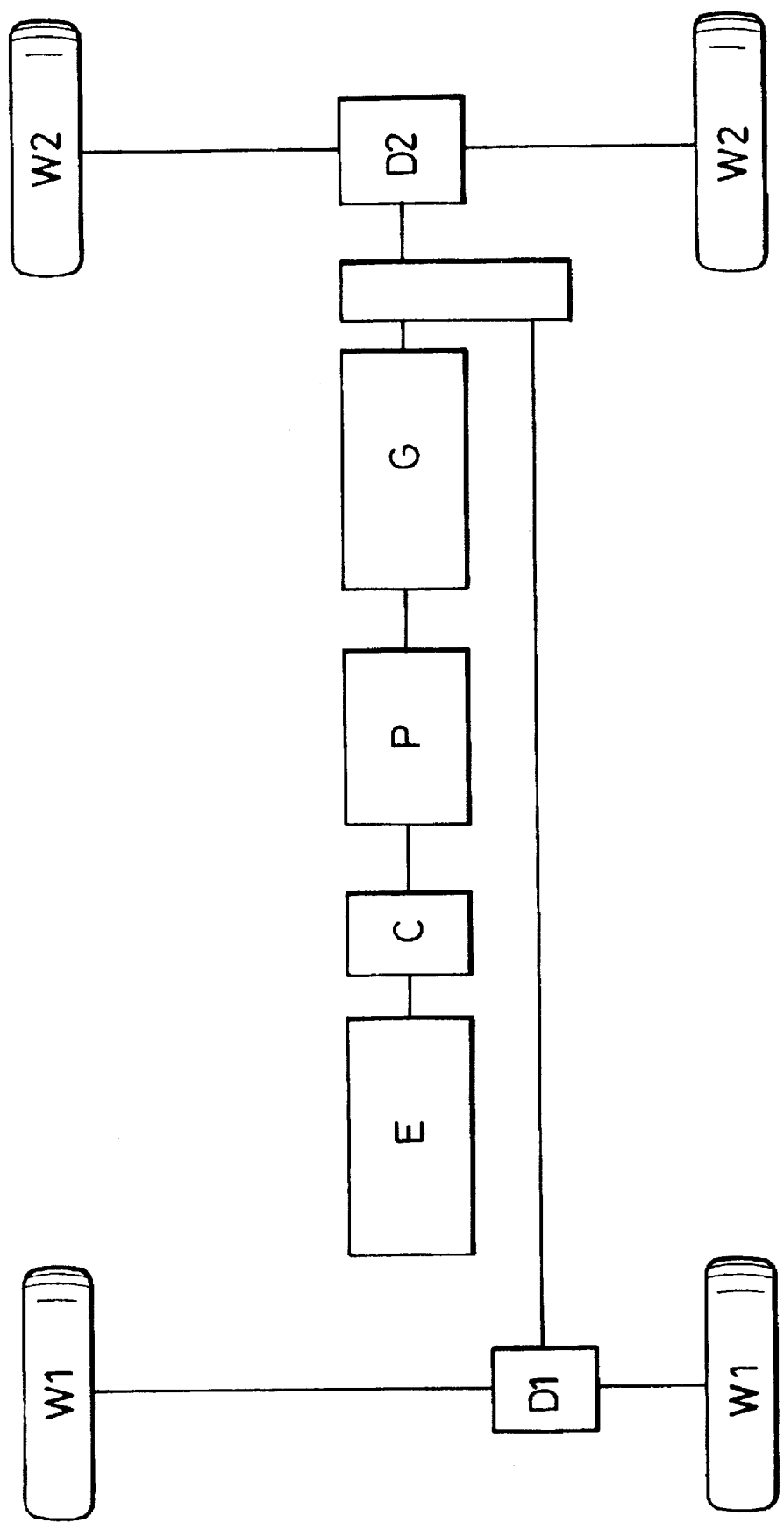
FIG. 4 is a schematic representation of a vehicle engine and transmission.

Referring to FIG. 4, an entire vehicle (tractor) driveline is shown schematically, with wheels W1, W2, front and rear differentials D1, D2, engine E, main gearbox G and powershift gearbox P. In this example, the clutch assembly according to the invention is a main clutch for connecting and disconnecting the transmission C, P, G etc with the engine E and is operated by a clutch pedal (not shown).

Figure 1:
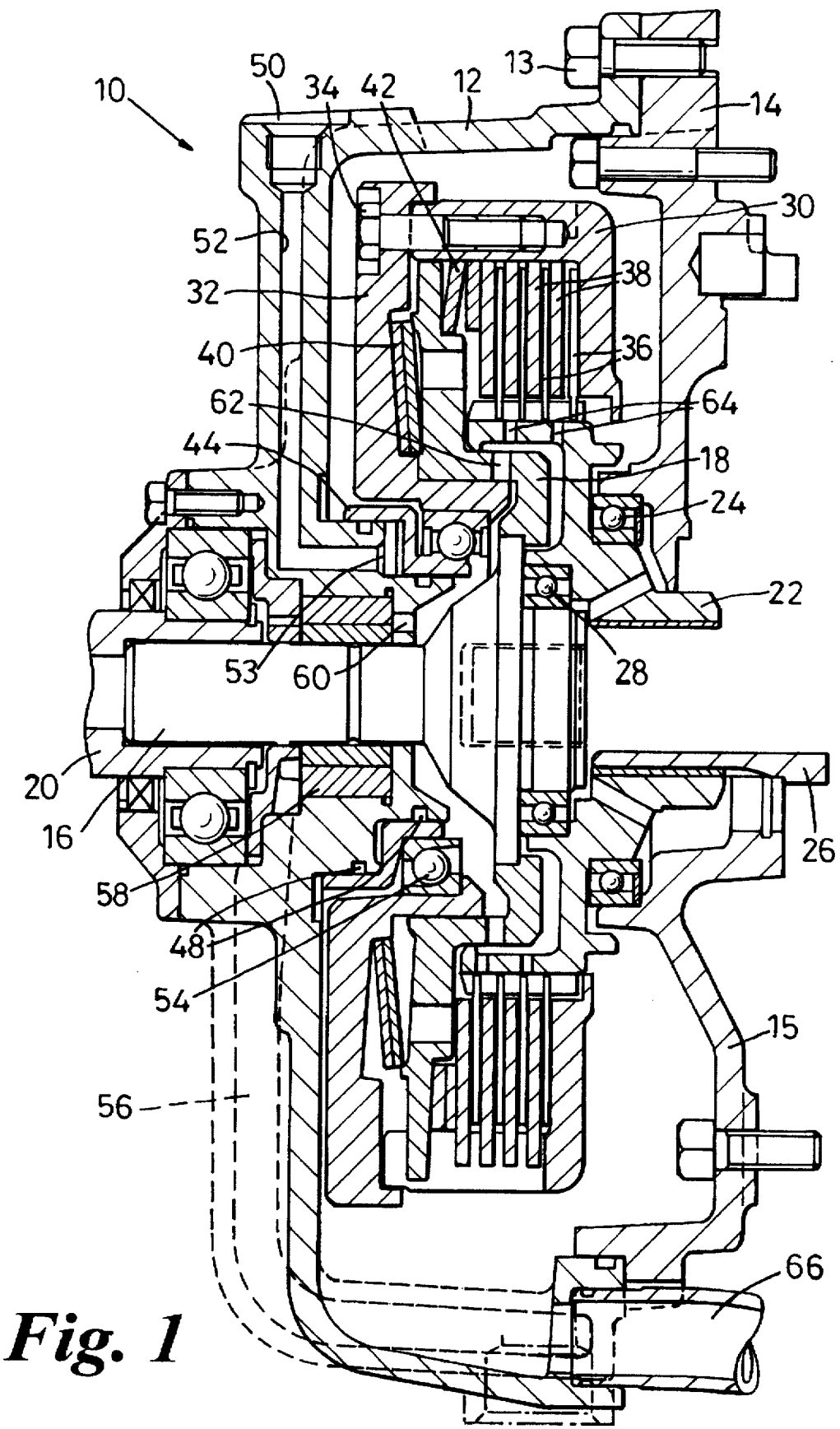
FIG. 1 shows a vertical cross-section through a clutch assembly according to the present invention, with the components shown with the clutch released in the upper half and engaged in the lower half.
Figure 2:
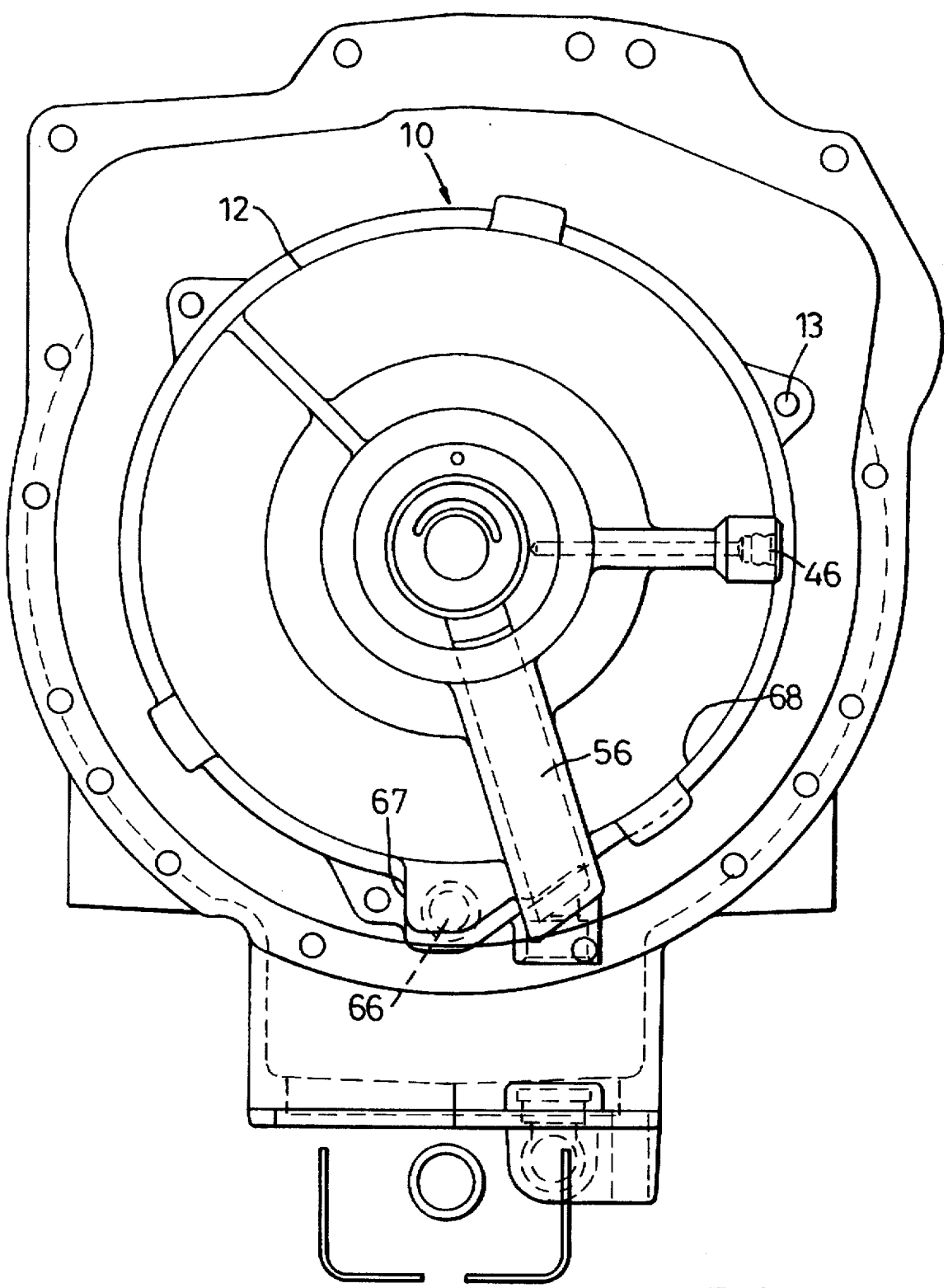
FIG. 2 shows a front view of the clutch assembly of FIG. 1.

Referring to FIGS. 1 and 2, a clutch assembly 10 includes a clutch cover 12 and a mounting plate 14 bolted together by bolts 13. Input is by means of a clutch drive shaft 16 and clutch drive plate 18 driven by an input shaft 20, which is the power take off drive shaft. The clutch drive shaft 16 incorporates splines for connection to the input shaft 20. Output is by means of a clutch output hub 22, located on the mounting plate 15 via a clutch hub bearing 24, and splined to an output shaft 26. A thrust bearing 28 is located between the clutch drive shaft 16 and the clutch output hub 22. The clutch hub bearing and thrust bearing are both combined seals and bearings of a form described in co-pending U.S. patent application Ser. No. 08/446,956.

A clutch drum 30 and pressure plate 32, located between the clutch cover 12 and mounting plate 14, are bolted together by bolts 34 and are connected for rotation with the clutch drive shaft 16 but not with the clutch output hub 22. Between the clutch drum 30 and pressure plate 32 are a number of friction discs 36, connected for rotation with the clutch output hub 22, and interleaved with an equal number of intermediate counterplates 38, connected for rotation with the clutch drum 30. Engagement Belleville springs 40 are located between the clutch drive plate 18 and the pressure plate 32. Cushion or progressivity Belleville springs 42 which provide for progressive engagement of the clutch are located between the clutch drive plate 18 and the first of the counterplates 38. The engagement and cushion Belleville springs 40 and 42 are selected as appropriate for the application for which the clutch assembly 10 is designed. FIG. 1 shows two Belleville springs in each location, however, the number used is also selected as appropriate for the application. Multiple cushion springs allow for, eg very sensitive control as the clutch is initially engaged, followed by less sensitive control as the clutch pedal is further depressed. In an alternative design, progressive engagement could be provided in some other way, for example with the discs and counterplates biassed against the pressure plate by the resilience of the clutch drum 30.

A clutch release piston 44 is located inside the clutch cover 12 but outside the clutch drum 30. The piston 44 does not rotate permitting use of standard non-rotational seals in the form of o-rings. Pressurised hydraulic fluid for operation of the piston 44 is supplied from a clutch master cylinder (not shown) via a control port 50 and bore 52 in the clutch cover 12. The clutch release piston 44 acts on the pressure plate 32 via an axial clutch release bearing 54. The bearing 54 and piston 44 may be made as an integral unit (as shown in the upper half of FIG. 1 ) or as two separate items (as shown in the lower half of FIG. 1 ).

Oil for cooling and lubrication of the clutch discs 36 and counterplates 38 is supplied from a sump (not shown) via an oil supply tube 56 (shown in dashed lines in FIG. 1 and solid lines in FIG. 2) and a pump 58 located around the clutch drive shaft 16. The rotation of the clutch forces the oil outwards and it passes from the pump 58 through a passage 60 in the clutch cover 12, through passages 62 in the clutch drive plate 18 and then through passages 64 in the clutch output hub 22 to the clutch discs 36 and counterplates 38. After the oil has passed between the discs 36 and counterplates 38 it is forced outwards to the inner surface of the clutch cover 12 and then flows around the clutch cover under the influence of the rotating clutch drum 30 and passes out of the clutch cover 12 along oil outlet tube 66. As can be seen in FIG. 2, the oil outlet tube 66 is located adjacent a shoulder 67. Oil flowing around the inner surface of the clutch cover 12 in the clockwise direction in FIG. 2 impinges on the shoulder 67 causing a build up of static pressure and thereby forcing the oil out of the outlet tube 66. From the point identified by reference numeral 68 in FIG. 2, the clutch cover 12 is non-circular, providing a lead-in to the shoulder 67.

The operation of the wet clutch assembly 10 will now be described. Referring to the lower half of FIG. 1, the clutch is shown fully engaged. In this position the friction discs 36 and counterplates 38 are forced into close contact and drive is transmitted from the input shaft 20 to the output hub 22. In addition the oil flows as previously described.

When the operator of the vehicle or machine in which the assembly 10 is incorporated wishes to disengage the clutch the clutch control pedal (not shown) is depressed and operates a clutch master cylinder (not shown). The hydraulic fluid expelled from the clutch master cylinder passes to the clutch release piston 44 via the control port 50 and bore 52. The fluid forces the clutch release piston 44 to move to the right, to the position shown in the upper half of FIG. 1. The movement of the piston 44 also causes the axial bearing 54, clutch drum 30 and pressure plate 32 to move to the right and the engagement Belleville springs 40 to be compressed. The counterplates 38, connected for movement with the clutch drum 32 thus move away from the friction discs 36 and drive is no longer transmitted from the input shaft 16 to the output hub 22.

In intermediate positions of the clutch pedal, the degree of pressure between the clutch discs and counterplates, and therefore the amount of torque transmitted by the clutch, depends on the spring constant(s) of the cushion spring (or springs) 42 and the degree to which the cushion spring 42 is compressed. This is because pressure is only transferred from the pressure plate 32 to the discs and counterplates via the cushion spring 42. A weak cushion spring will therefore allow small changes in torque for relatively large movements of the clutch pedal, until the spring is completely flattened. A stronger cushion will, conversely, allow for a greater rate of change of torque as the clutch pedal is moved. It is envisaged that two or more cushion springs could be provided. The weakest spring would be compressed first, providing a very gradual initial engagement of the clutch, with a stronger spring then taking over to provide a greater rate of increase of torque. Further springs could be added to provide any number of stages.

Figure 3:
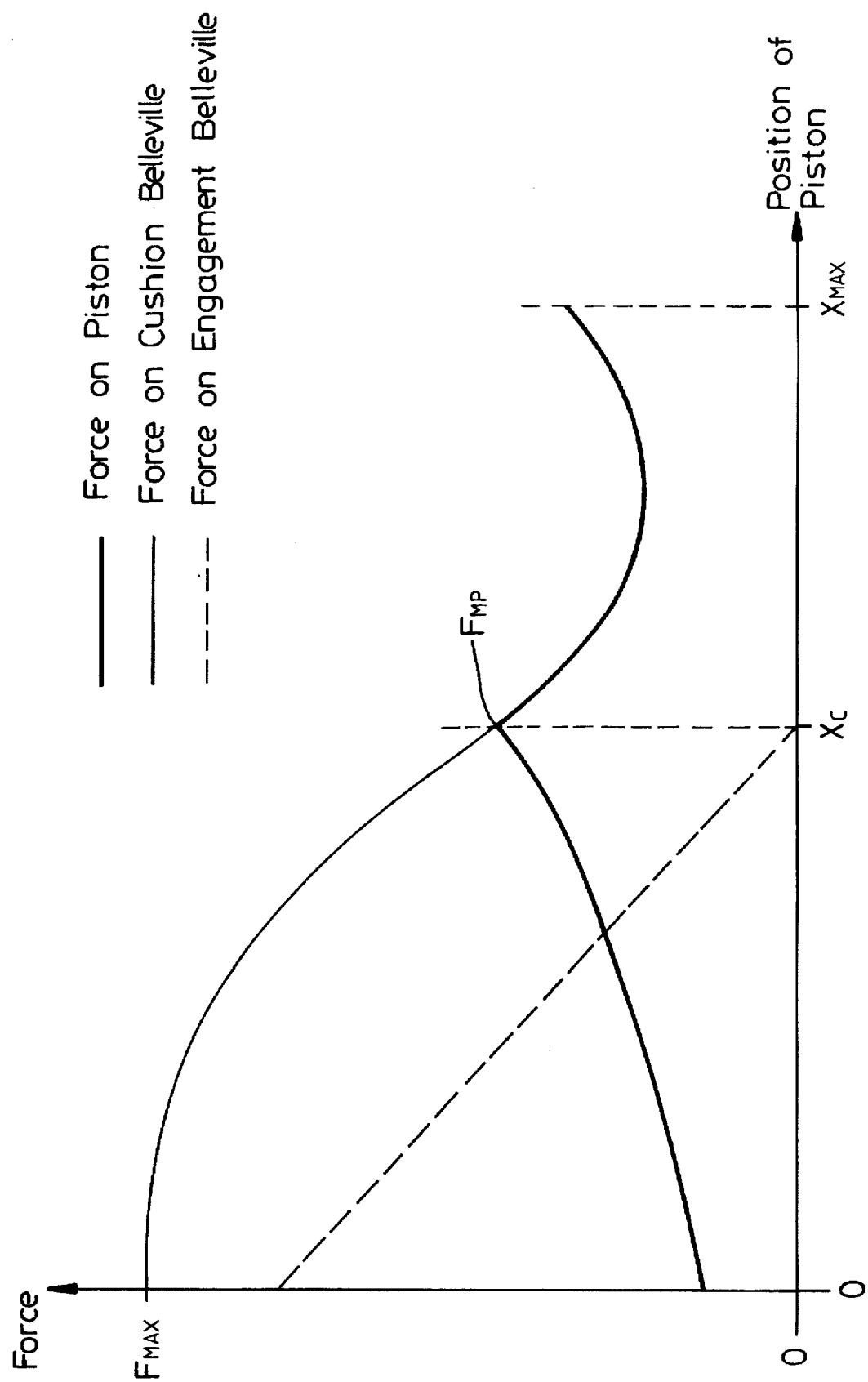
FIG. 3 is a diagrammatic representation of forces within a clutch assembly according to the invention.

Referring to FIG. 3, in which various forces in the clutch are represented, a further advantage of using cushion Belleville(s) will be explained.

The FIG. 3 diagram plots the position of the piston 44 against force. At position the clutch is fully engaged. F max is exerted by the engagement Belleville on the stack of discs and counterplate. As the clutch is disengaged, force needs to be applied by the hydraulic piston, however the piston is assisted by the force exerted by the cushion Belleville(s), so that the force exerted by the piston is the difference between the force exerted by the engagement Belleville(s) and the cushion Belleville(s). The maximum force which the piston must exert ($F_{MP}$) occurs at $X_c$, the point where the cushion Belleville(s) are competely relaxed and no longer assist the piston. $F_{MP}$ is much less than it would be if the cushion Belleville(s) were not present (in which case it would equal $F_{MAX}$), and the piston may therefore be less powerful than it would otherwise need to be. $X_{MAX}$ represents the maximum stroke, or fully disengaged position of the piston.

In the fully disengaged position, the pressure plate 32 blocks the passages 62 through the clutch drive plate 18 cutting off the oil flow and thus reducing drag.

The oil continues to be pumped by the pump 58 and to pass through the passage in the clutch cover 12. However, it then passes through the axial bearing 54, bypassing the clutch plates, and is removed from the clutch cover as previously described.

I claim:

1. A wet clutch assembly comprising a stack of interleaved, substantially parallel, clutch members and means for applying pressure to said stack to engage said clutch members for transmission of torque, said pressure applying means comprising:

a) an element at each end of said stack, one or both of which are axially movable;

b) at least one resilient engagement member interposed between a stationary member and one of said elements and biasing said clutch members into engagement; and c) at least two resilient progressivity members, each having a different spring characteristic, arranged in series to control the magnitude of pressure transmitted to said stack in dependence on the distance moved by said element or elements, for a predetermined range of movement of said elements.

2. A wet clutch assembly as claimed in claim 1 wherein each of said progressivity members comprises a Belleville spring.

3. A wet clutch assembly as claimed in claim 1 wherein one of said progressivity members is provided by one of said elements.

4. A wet clutch assembly as claimed in claim 1 further including hydraulic means for disengaging the clutch members.

5. A vehicle including a wet clutch assembly as claimed in claim 1, said vehicle having an engine and transmission, said wet clutch assembly being arranged to control the engagement or disengagement of the vehicle transmission with the vehicle engine.

* * * * *

UNITED STATES PATENT AND TRADEMARK OFFICE
CERTIFICATE OF CORRECTION

PATENT NO. : 5,687,821
DATED : November 18, 1997
INVENTOR(S) : Patrick Lorriette It is certified that error appears in the above-indentified patent and that said Letters Patent is hereby corrected as shown below:

Column 4, Claim 1, Line 48, after "said", insert -- element or --.

Signed and Sealed this

Tenth Day of February, 1998

Attest:

BRUCE LEHMAN

*Attesting Officer*   *Commissioner of Patents and Trademarks*